US007117755B2

(12) United States Patent
Yang (10) Patent No.: US 7,117,755 B2
(45) Date of Patent: Oct. 10, 2006

(54) TORQUE SENSOR FOR VEHICLE (75) Inventor: I-Jin Yang, Pyungtak-Si (KR)

(73) Assignee: Mando Corporation, Pyungtak-Si (KR)

( * ) Notice: Subject to any disclaimer, the term of this patent is extended or adjusted under 35 U.S.C. 154(b) by 0 days.

(21) Appl. No.: 10/981,929

(22) Filed: Nov. 4, 2004

(65) Prior Publication Data

US 2005/0103127 A1   May 19, 2005

(30) Foreign Application Priority Data

Nov. 13, 2003 (KR) ............... 10-2003-0080275

(51) Int. Cl.
*G01L 3/02* (2006.01)
*G01L 3/14* (2006.01)

(52) U.S. Cl. ............. 73/862.334; 73/862; 73/862.328; 73/862.331; 73/862.332; 73/862.333; 73/862.335

(58) Field of Classification Search ........... 73/862.334, 73/862.328, 862.331, 862.332, 862.333, 73/862.335

See application file for complete search history.

(56) References Cited

U.S. PATENT DOCUMENTS 5,165,286 A * 11/1992 Hamamura et al. ........... 73/779
5,307,691 A * 5/1994 Miyake et al. ......... 73/862.333
6,239,529 B1 * 5/2001 Chikaraishi ................. 310/194
6,895,828 B1 * 5/2005 Nakatani et al. ....... 73/862.331
2002/0129666 A1 * 9/2002 Kim et al. ............. 73/862.331
2005/0028613 A1 * 2/2005 Onoda et al. .......... 73/862.331

FOREIGN PATENT DOCUMENTS

JP          2000-193541        1/2000

* cited by examiner

*Primary Examiner*—Edward Lefkowitz
*Assistant Examiner*—Freddie Kirkland, III
(74) *Attorney, Agent, or Firm*—Ladas & Parry LLP (57) ABSTRACT A torque sensor including a first step formed on an inner peripheral surface of a sensor housing, a second step formed on an outer peripheral surface of a detection coil assembly, the first and second steps axially supporting each other, and a groove formed on the outer peripheral surface of the detection coil assembly at a position adjacent to the second step such that the groove faces an inner surface portion of the first step, so that the first step penetrates the groove while being plastically deformed when the detection coil assembly is pressed toward the first step, thereby causing the detection coil assembly to be fixed to the inner peripheral surface of the sensor housing. Since the detection coil assembly is fixed in the sensor housing through the structural modification of the sensor housing and detection coil assembly, without using a separate fixing member, it is possible to effectively achieve the fixing of the detection coil assembly, and thus, to reduce the number of elements in the torque sensor.

8 Claims, 5 Drawing Sheets

TORQUE SENSOR FOR VEHICLE

CROSS-REFERENCE TO RELATED APPLICATION

This application claims the benefit of Korean Patent Application No. 2003-80275, filed on Nov. 13, 2003 in the Korean Intellectual Property Office, the disclosure of which is incorporated herein by reference.

BACKGROUND OF THE INVENTION

1. Field of the Invention

The present invention relates to a torque sensor used in a power steering system of a vehicle, and more particularly to a torque sensor for a vehicle in which a detection coil assembly included in the torque sensor has a modified structure to be fixed using a sensor housing, without using a separate fixing member, thereby being capable of reducing the number of elements in the torque sensor.

2. Description of the Related Art

Generally, a vehicle can steer a running direction thereof in accordance with operation of a steering wheel connected to wheels via a steering shaft. However, when the friction between the wheels and the ground is high, it is impossible to easily and rapidly steer the vehicle because an increased force is required to operate the steering wheel. In order to solve this problem, a power steering device is used. The power steering device is installed, as an auxiliary power generating device, in a steering system to perform a servo operation to reduce the operating force for the steering wheel.

The steering shaft of a vehicle, in which a power steering device is equipped, is divided into an input shaft and an output shaft. The input shaft is coupled to a steering wheel, whereas the output shaft is coupled to a pinion engaged with a rack bar formed at a tie rod. The input and output shafts are connected by a torsion bar. When the steering wheel is rotated, the output shaft is rotated, so that the direction of wheels coupled to the tie rod is varied in accordance with a gearing operation carried out between the pinion and the rack bar. Where the friction between the wheels and the ground is high, the gearing operation between the pinion and the rack bar cannot be smoothly carried out. In this case, the output coupled to the pinion is rotated in a range less than the rotation range of the input shaft coupled to the steering wheel, so that the torsion bar is twisted. The twisting range of the torsion bar is transmitted in the form of an electrical signal to an electronic control unit. Based on the transmitted electrical signal, the electronic control unit controls the auxiliary power generating device coupled to the rack bar to compensate for rotation of the output shaft, and thus, to enhance the operating force of the steering wheel. The twist of the torsion bar is sensed by a torque sensor.

Figure 1:
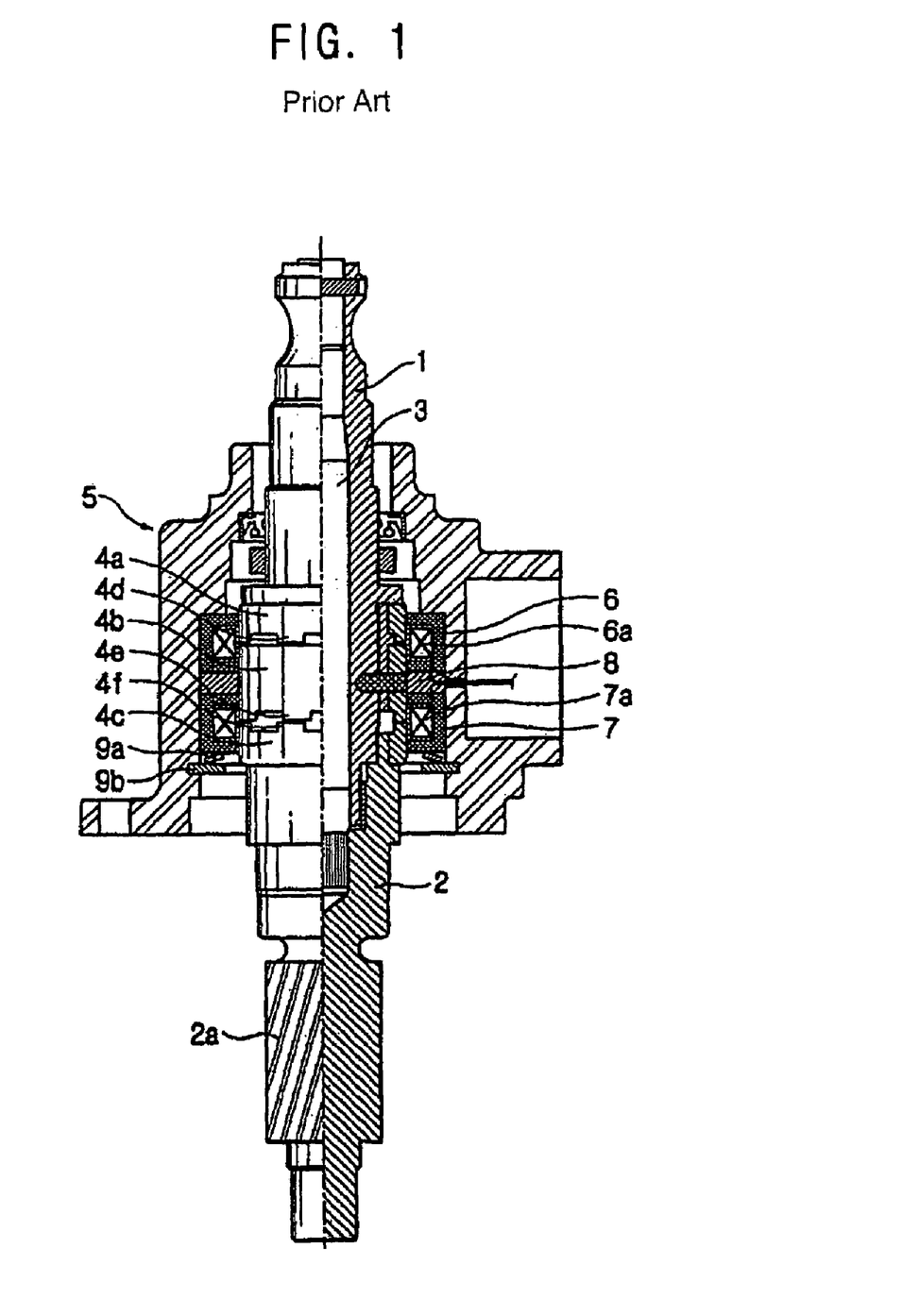
FIG. 1 is a sectional view illustrating the structure of a conventional torque sensor used in vehicles.

FIG. 1 is a sectional view illustrating the structure of a conventional torque sensor used in vehicles. As shown in FIG. 1, the conventional torque sensor includes a torsion bar 3 to coaxially connect a lower end of an input shaft 1 and an upper end of an output shaft 2, three detection rings 4a, 4b and 4c made of a magnetic material and fixedly fitted around connecting portions of the input and output shafts 1 and 2 in a state of being uniformly axially spaced apart from one another, and a cylindrical sensor housing 5 to enclose the detection rings 4a, 4b and 4c.

The output shaft 2 is coupled, at a lower end thereof, with a pinion 2a engaged with a rack bar (not shown) formed at a tie rod (not shown) connected to wheels (not shown). The input shaft 1 is coupled, at an upper end thereof, with a steering wheel (not shown). Accordingly, when the steering wheel is rotated, the torsion bar 3, which connects the input and output shafts 1 and 2, is twisted, thereby causing the output shaft 2 to rotate.

The first and second detection rings 4a and 4b are fixedly fitted around the input shaft 1 to rotate through the same angle as the steering wheel (not shown), whereas the third detection ring 4c is fixedly fitted around the output shaft 2 to rotate together with the output shaft 2. Teeth 4d, 4e and 4f are formed at lower surfaces of the first and second detection rings 4a and 4b, and an upper surface of the third detection ring 4c. The teeth 4d, 4e and 4f are formed in the form of repeated protrusions and grooves.

A temperature compensating detection coil assembly 6 and a magnetically-resistant detection coil assembly 7 are disposed in the sensor housing 5 such that the detection coil assemblies 6 and 7 enclose the teeth 4d, 4e and 4f of the detection rings 4a, 4b and 4c. Wound coils 6a and 7a are included in the detection coil assemblies 6 and 7 to co-operate the teeth 4d, 4e and 4f, and thus, to form magnetic circuits, respectively. The temperature compensating detection coil assembly 6 is arranged to enclose facing portions of the first and second detection rings 4a and 4b, whereas the magnetically-resistant detection coil assembly 7 is arranged to enclose facing portions of the second and third detection rings 4b and 4c. A spacer 8 is interposed between the detection coil assemblies 6 and 7.

The facing area of the teeth 4e and 4f of the second and third detection rings 4b and 4c is varied in accordance with twist of the torsion bar 3. Due to the facing area variation, the inductance of the magnetically-resistant detection coil assembly 7 varies. The rotation deviation between the input and output shafts 1 and 2 is detected by measuring the inductance variation.

In order to accurately detect a torque applied to the torsion bar 3, the detection coil assemblies 6 and 7 must be fixed in the sensor housing 5 so that the positions of the detection coil assemblies 6 and 7 are not shifted. Accordingly, a "C"-shaped fixing ring 9a is fixedly mounted in magnetically-resistant detection coil assembly 7 to fix the positions of the detection coil assemblies 6 and 7. Also, a wave washer 9b is interposed between the fixing ring 9a and the magnetically-resistant detection coil assembly 7. By the fixing ring 9a and wave washer 9b, the axial positions of the detection coil assemblies 6 and 7 in the sensor housing 5 are fixed.

However, since separate fixing members such as the fixing ring 9a and wave washer 9b must be used to fix the detection coil assemblies 6 and 7, the conventional torque sensor involves an increase in the number of constituent elements, and thus, a degradation in productivity.

SUMMARY OF THE INVENTION

The present invention has been made in view of the above-mentioned problems, and an aspect of the invention is to provide a torque sensor for a vehicle in which a sensor housing and a detection coil assembly mounted in the sensor housing have modified structures so that the detection coil assembly is fixed without using a separate fixing member, thereby being capable of reducing the number of elements in the torque sensor, and thus, achieving an improvement in productivity.

In accordance with one aspect, the present invention provides a torque sensor comprising a torsion bar to coaxially connect an input shaft coupled with a steering wheel and an output shaft coupled with a steering mechanism, at least two detection rings fixedly fitted around the input and output shafts, at least one detection coil assembly having an annular structure to enclose adjacent portions of the detection rings, and a sensor housing to receive the detection coil assembly, further comprising: a first step formed on an inner peripheral surface of the sensor housing; a second step formed on an outer peripheral surface of the detection coil assembly, the first and second steps axially supporting each other; and a groove formed on the outer peripheral surface of the detection coil assembly at a position adjacent to the second step such that the groove faces an inner surface portion of the first step, so that the first step penetrates the groove while being plastically deformed when the detection coil assembly is pressed toward the first step.

The detection coil assembly may be made of a material having a hardness larger than the sensor housing.

The detection coil assembly may be made of a steel material, and the sensor housing may be made of an aluminum material.

The first step may be circumferentially formed on the sensor housing, and the second step and groove may be circumferentially formed on the detection coil assembly.

The at least one detection coil assembly may comprise a plurality of detection coil assemblies, and the first step may be formed on the inner peripheral surface of the sensor housing at the side of a lowermost one of the detection coil assemblies, and the second step and groove are formed at the outer peripheral surface of the lowermost detection coil assembly so that the remaining detection coil assemblies disposed over the lowermost detection coil assembly may be fixed by the lowermost detection coil assembly.

Each of the detection coil assemblies may be assembled in the sensor housing through a lower end of the sensor housing, and each of the remaining detection coil assemblies disposed over the lowermost detection coil assembly may have an outer diameter smaller than an inner diameter of the sensor housing at the first step.

The at least one detection coil assembly may comprise a plurality of detection coil assemblies. In this case, the first step may be formed on the inner peripheral surface of the sensor housing at the side of each detection coil assembly, and the second step and groove may be formed at the outer peripheral surface of each detection coil assembly so that the detection coil assemblies may be fixed in an independent manner, respectively.

Each of the detection coil assemblies may be assembled in the sensor housing through a lower end of the sensor housing. In this case, the first step corresponding to an upper one of the detection coil assemblies, which are vertically adjacent to each other, may have an inner diameter smaller than an inner diameter of the first step corresponding to a lower one of the vertically-adjacent detection coil assemblies, and the upper and lower detection coil assemblies may have outer diameters respectively corresponding to the inner diameters of the first steps so that the upper detection coil assembly does not interfere with the first step corresponding to the lower detection coil assembly during a process of assembling the detection coil assemblies.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF THE PREFERRED EMBODIMENTS

Reference will now be made in detail to the embodiments of the present invention, examples of which are illustrated in the accompanying drawings. The embodiments are described below to explain the present invention by referring to the figures.

Figure 2:
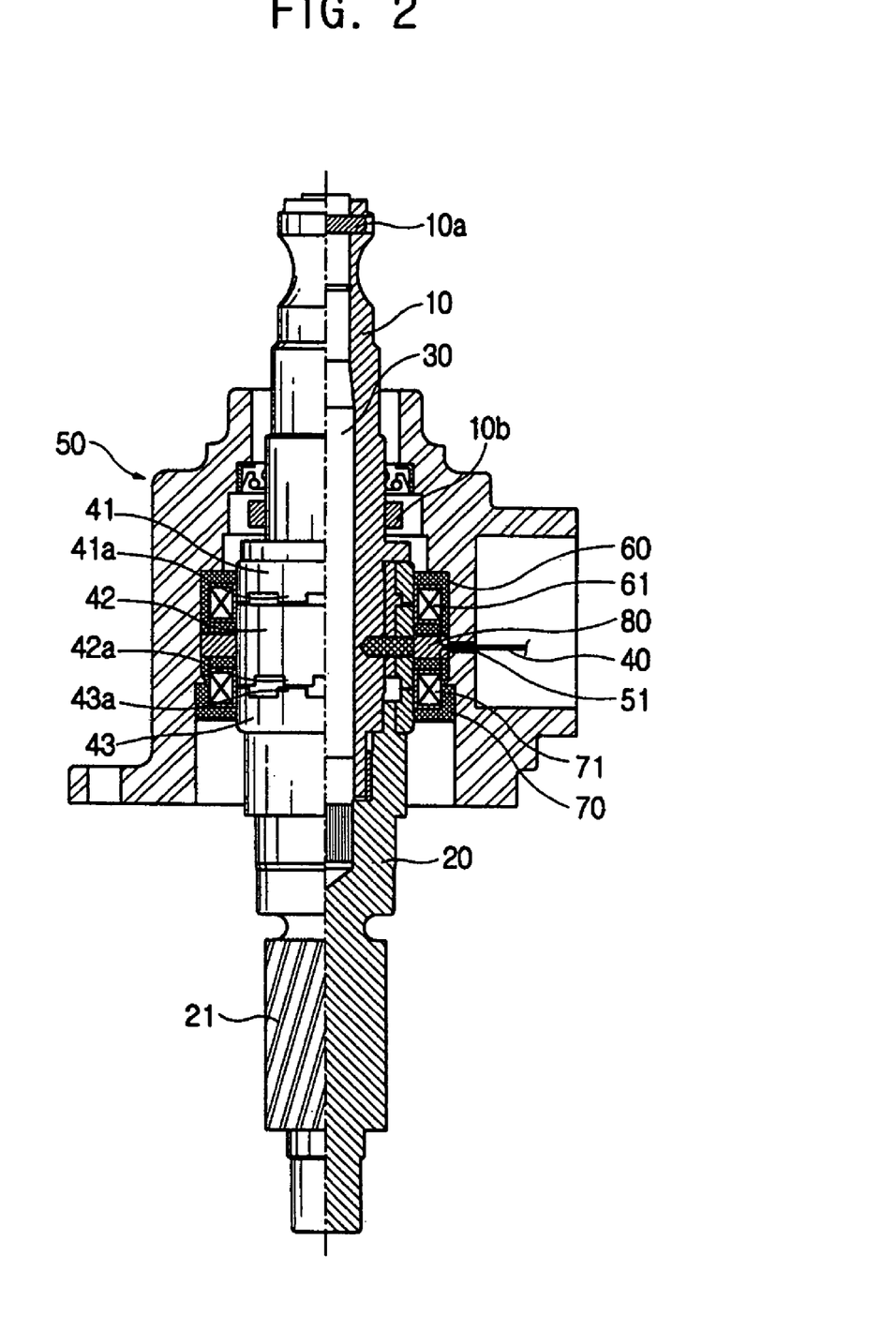
FIG. 2 is a sectional view illustrating the overall structure of a torque sensor for a vehicle in accordance with an embodiment of the present invention.

Referring to FIG. 2, a torque sensor for a vehicle according to an embodiment of the present invention is illustrated. As shown in FIG. 2, the torque sensor includes a torsion bar 30 to coaxially connect a lower end of an input shaft 10 and an upper end of an output shaft 20, a plurality of detection rings (in the illustrated case, three detection rings 41, 42 and 43) fixedly fitted around the input and output shafts 10 and 20, and a sensor housing 50 to enclose the detection rings 41, 42 and 43.

The output shaft 20 is coupled with a steering mechanism (not shown) connected to wheels (not shown) of the vehicle. The output shaft 20 is formed, at a lower end thereof, with a pinion 21 to be engaged with a rack bar (not shown) formed at a tie rod (not shown) connected to the wheels. The input shaft 10 is coupled, at an upper end thereof, with a steering wheel (not shown). Accordingly, when the steering wheel is rotated under the condition in which the friction between the wheels and the ground is high, the torsion bar 30 rotates the output shaft 2 while being twisted in accordance with the rotation of the steering wheel. The upper end of the torsion bar 30 is fixed to the input shaft 10 via a parallel pin 10a. The lower end of the torsion bar 30 is tightly fitted in the upper end of the output shaft 20 extending upwardly into a lower portion of the sensor housing 50. A roller bearing member 10b is fitted in an upper portion of the sensor housing 50 to rotatably support the input shaft 10.

The detection rings 41, 42 and 43 are made of a magnetic material, and fixedly fitted around connecting portions of the input and output shafts 10 and 20. The first and second detection rings 41 and 42 are fixedly fitted around the input shaft 1 at the lower end of the input shaft 10, whereas the third detection ring 43 is fixedly fitted around the output shaft 20 at the upper end of the output shaft 20. Teeth 41a, 42a and 43a are formed at the lower ends of the first and second detection rings 41 and 42, and the upper end of the third detection ring 43. The teeth 41a, 42a and 43a are formed in the form of repeated protrusions and grooves.

The sensor housing 50 has a cylindrical structure opened at upper and lower ends thereof. The sensor housing 50 has an inner peripheral surface to enclose the detection rings 41, 42 and 43. Detection coil assemblies 60 and 70 are fitted in the sensor housing 50 to enclose the teeth 41a, 42a and 43a of the detection rings 41, 42 and 43. The detection coil assemblies 60 and 70 cooperate with the teeth 41a, 42a and 43a to form magnetic circuits. The detection coil assembly 60, which is a temperature compensating detection coil assembly, is interposed between the first and second detection rings 41 and 42. The detection coil assembly 70, which is a magnetically-resistant detection coil assembly, is interposed between the second and third detection rings 42 and 43. The detection coil assemblies 60 and 70 have annular shapes, and include wound coils 61 and 71, respectively.

The coils 61 and 71 of the detection coil assemblies 60 and 70 are electrically connected to a signal processor (not shown) installed at an appropriate portion of the vehicle via a cable 40. A cable hole 51 is formed at a portion of a peripheral surface of the sensor housing 50 to allow the cable 40 to extend through the cable hole 51.

The facing area of the teeth 42a and 43a of the second and third detection rings 42 and 43 is varied in accordance with twist of the torsion bar 30. Due to the facing area variation, the inductance of the magnetically-resistant detection coil assembly 70 varies. The rotation deviation between the input and output shafts 10 and 20 is detected by measuring the inductance variation. On the other hand, the facing area of the teeth 41a and 42a of the first and second detection rings 41 and 42 is constant. Accordingly, the inductance of the temperature compensating detection coil assembly 60 is varied, depending on only temperature. Thus, the temperature compensating detection coil assembly 60 compensates for a rotation deviation between the input and output shafts 10 and 20 caused by a temperature variation. In order to prevent the detection coil assemblies 60 and 70 from interfering with each other, a spacer 80 is interposed between the detection coil assemblies 60 and 70 to space the detection coil assemblies 60 and 70 apart from each other by a predetermined distance.

In order to accurately detect a torque applied to the torsion bar 30, the detection coil assemblies 60 and 70 must be fixed in the sensor housing 50 so that the positions of the detection coil assemblies 60 and 70 are not shifted. In accordance with the illustrated embodiment of the present invention, the inner peripheral surface structure of the sensor housing 50 and the outer structure of the magnetically-resistant detection coil assembly 70 are modified to fix the detection coil assemblies 60 and 70 in the sensor housing 50 without using a separate fixing member. By the fixing structures of the detection coil assemblies 60 and 70 according to the illustrated embodiment of the present invention, the detection coil assemblies 60 and 70 can be effectively fixed in the sensor housing 50 without using a separate fixing member. Accordingly, the number of constituent elements in the torque sensor is reduced, so that an enhancement in the productivity of the torque sensor is achieved.

In detail, the detection coil assemblies 60 and 70 and spacer 80 are assembled in the sensor housing 50 through the lower end of the sensor housing 50 in the order of the temperature compensating detection coil assembly 60, spacer 80 and magnetically-resistant detection coil assembly 70. The assembly of detection coil assemblies 60 and 70 and spacer 80 is completed when the magnetically-resistant detection coil assembly 70 is fixed at a lowermost position in the sensor housing 50.

Figure 3:
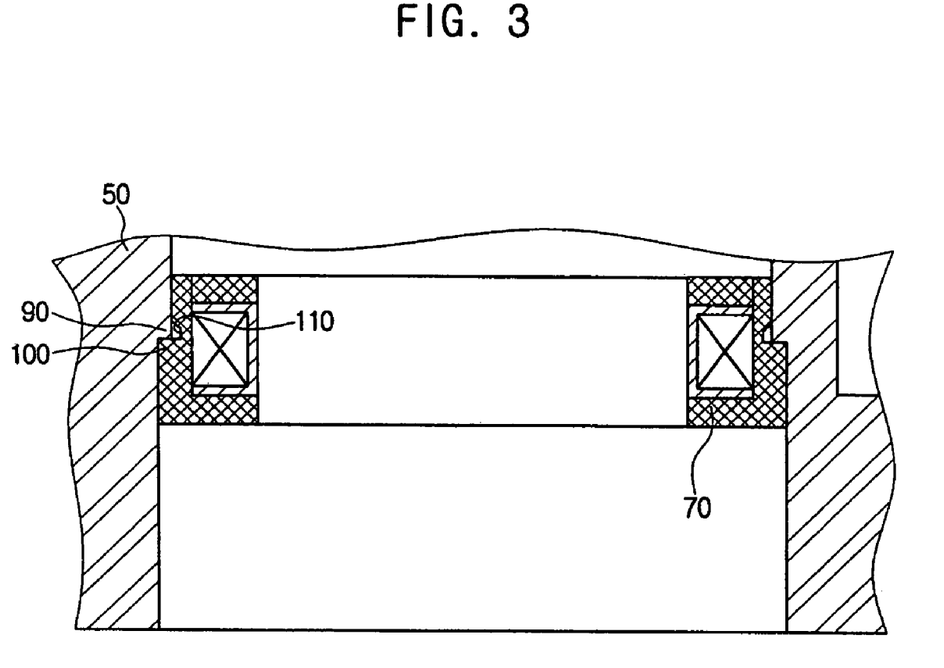
FIG. 3 is an enlarged and exploded sectional view illustrating a part of the torque sensor illustrated in FIG. 2.
Figure 4:
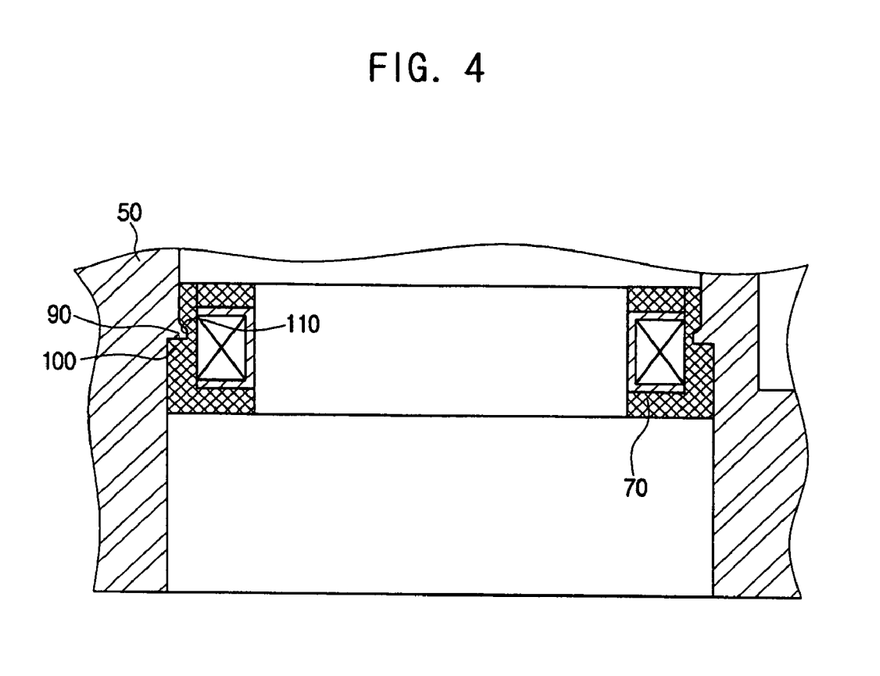
FIG. 4 is an enlarged sectional view illustrating the torque sensor part shown in FIG. 3.

As shown in FIG. 3, the inner peripheral surface of the sensor housing 50 has a step at a portion corresponding to the outer peripheral surface of the magnetically-resistant detection coil assembly 70. That is, the sensor housing 50 has a first step 90 circumferentially formed on the inner peripheral surface of the sensor housing 50. The magnetically-resistant detection coil assembly 70 has a second step 100 circumferentially formed on the outer peripheral surface of the magnetically-resistant detection coil assembly 70. The first and second steps 90 and 100 axially support each other so that the magnetically-resistant detection coil assembly 70 is supported by the sensor housing 50. A groove 110 is circumferentially formed on the outer peripheral surface of the magnetically-resistant detection coil assembly 70 at a position adjacent to the second step 100 such that the groove 110 faces an inner peripheral surface portion of the first step 90. When the magnetically-resistant detection coil assembly 70 is pressed toward the first step 90 using a pressing tool under the condition in which the first and second steps 90 and 100 are axially supported by each other, the first step 90 penetrates the groove 110 while being plastically deformed, as shown in FIG. 4.

As the first step 90 is plastically deformed to penetrate the groove 110, the magnetically-resistant detection coil assembly 70 is fixed in the sensor housing 50. Since the magnetically-resistant detection coil assembly 70 is fixed in the sensor housing 50, the temperature compensating detection coil assembly 60 and spacer 80 positioned over the magnetically-resistant detection coil assembly 70 are axially fixed in the sensor housing 50. Accordingly, the detection coil assemblies 60 and 70, which are fixed in position in the sensor housing 50, can more accurately detect a torque applied to the torsion bar 30.

It is desirable that the magnetically-resistant detection coil assembly 70 is made of a material having a hardness higher than that of the sensor housing 50 so that the first step 90 is deformed while being pressed by the second step 100 when the magnetically-resistant detection coil assembly 70 is pressed toward the first step 90. To this end, the magnetically-resistant detection coil assembly 70 is made of a steel material having a high hardness, whereas the sensor housing 50 is made of an aluminum material having a hardness relatively less than steel materials while being superior in terms of elongation and extensibility.

In order to prevent the temperature compensating detection coil assembly 60 and spacer 80 from interfering with the first step 90 during the process of inserting the temperature compensating detection coil assembly 60 and spacer 80 into the sensor housing 50 through the lower end of the sensor housing 50, it is desirable that the temperature compensating detection coil assembly 60 and spacer 80 have a diameter slightly smaller than the inner diameter of the sensor housing 50 at the step 90.

Hereinafter, operation of the torque sensor having the above-described configuration according to the illustrated embodiment of the present invention will be described.

When a driver steers the steering wheel (not shown) of the vehicle equipped with the torque sensor according to the illustrated embodiment of the present invention during the running of the vehicle, a steering mechanism (not shown) is operated via the input shaft 10 and the output shaft 20 connected to the input shaft 10 via the torsion bar 30, so that the direction of the wheels (not shown) is changed. When a steering force equal to or higher than a predetermined level is applied to the steering wheel, the torsion bar 30 is twisted because the rotation angle of the output shaft 20 connected to the input shaft 10 via the torsion bar 30 is smaller than the rotation angle of the input shaft 10 equal to the rotation angle of the steering wheel due to friction generated between the wheels and the ground. The facing area of the teeth 42a and 43a of the second and third detection rings 42 and 43 is varied in accordance with the twist of the torsion bar 30. Due to the facing area variation, the inductance of the magnetically-resistant detection coil assembly 70 varies. Also, voltages respectively induced in the coils 61 and 71 vary. Such induced voltage variations are caused by variations in the magnetic resistances of the coils 61 and 71, respectively. The induced voltage variations are inputted in the form of electrical signals to a controller (not shown) via the signal processor (not shown). The controller (not shown) measures a steering deviation, based on the inputted electrical signals, and controls the auxiliary power generating device (not shown) to compensate for the steering deviation.

When the magnetically-resistant detection coil assembly 70 is pressed toward the first step 90 under the condition in which the first and second steps 90 and 100 provided at the inner peripheral surface of the sensor housing 50 at the side of the magnetically-resistant detection coil assembly 70 are axially supported by each other, the first step 90 penetrates the groove 110 of the magnetically-resistant detection coil assembly 70. As a result, the magnetically-resistant detection coil assembly 70 is fixed in the sensor housing 50, and thus, the temperature compensating detection coil assembly 60 is fixed in the sensor housing 50. Accordingly, the detection coil assemblies 60 and 70 can accurately detect the torque applied to the torsion bar 30 by virtue of the fixing structures of the detection coil assemblies 60 and 70. Since it is unnecessary to use a separate fixing member, the number of constituent elements in the torque sensor is reduced, so that an enhancement in the productivity of the torque sensor is achieved.

Figure 5:
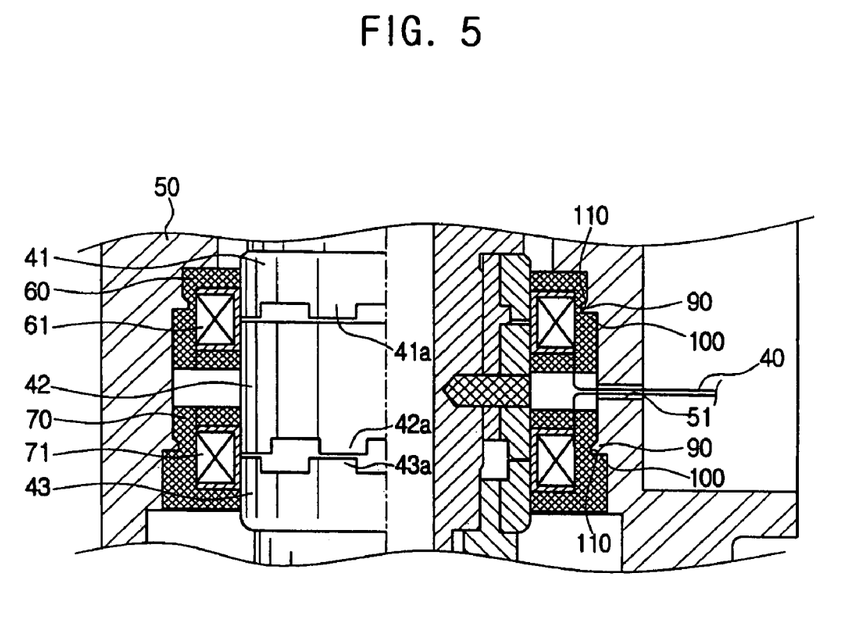
FIG. 5 is an enlarged sectional view illustrating a part of a torque sensor for a vehicle in accordance with another embodiment of the present invention.

As shown in FIG. 5, in accordance with another embodiment of the present invention, the first step 90 may also be circumferentially formed on the inner peripheral surface of the sensor housing 50 at the side of the temperature compensating detection coil assembly 60, and the second step 100 may also be formed circumferentially on the outer peripheral surface of the magnetically-resistant detection coil assembly 70. In this case, the groove 110 is also circumferentially formed on the outer peripheral surface of the temperature compensating detection coil assembly 60 at a position adjacent to the second step 100 of the magnetically-resistant detection coil assembly 70 such that the groove 110 faces an inner peripheral surface portion of the first step 90 formed at the side of the temperature compensating detection coil assembly 60. In this case, when the detection coil assemblies 60 and 70 are pressed toward the first steps 90, the first steps 90 penetrate the grooves 11, so that the detection coil assemblies 60 and 70 are fixed in the sensor housing 50, respectively. Accordingly, the detection coil assemblies 60 and 70 can be fixed in the sensor housing 50 while being spaced apart from each other by a desired distance without using the spacer 80. Therefore, it is possible to further reduce the number of constituent elements of the torque sensor.

The detection coil assemblies 60 and 70 are made of a steel material having a high hardness, and the sensor housing 50 is made of an aluminum material having a hardness relatively less than steel materials so that the first steps 90 penetrate respective grooves 110 as they are deformed while being pressed when the detection coil assemblies 60 and 70 are pressed toward the first steps 90, respectively.

The detection coil assemblies 60 and 70 are assembled in the sensor housing 50 through the lower end of the sensor housing 50 in the order of the temperature compensating detection coil assembly 60 and magnetically-resistant detection coil assembly 70. Accordingly, it is necessary to prevent the temperature compensating detection coil assembly 60, which is assembled earlier than the magnetically-resistant detection coil assembly 70, from interfering with the first steps 90. To this end, the first step 90 corresponding to the temperature compensating detection coil assembly 60 has a diameter smaller than the inner diameter of the first step 90 corresponding to the magnetically-resistant detection coil assembly 70. Also, respective outer diameters of the detection coil assemblies 60 and 70 must correspond to the inner diameters of the first steps 90.

In accordance with the embodiment of the present invention illustrated in FIG. 5, the inner peripheral surface structure of the sensor housing 50 and the outer structures of the detection coil assemblies 60 and 70 are modified to fix the detection coil assemblies 60 and 70 in the sensor housing 50 without using a separate fixing member. Accordingly, the number of constituent elements in the torque sensor is reduced, so that an enhancement in the productivity of the torque sensor is achieved.

As apparent from the above description, the present invention provides a torque sensor, which includes a sensor housing provided with a first step, and a detection coil assembly provided with a second step and a groove formed at a position adjacent to the second step such that the groove faces an inner peripheral surface portion of the first step. When the detection coil assembly is pressed toward the first step, the first step is plastically deformed to penetrate the groove of the detection coil assembly. As a result, the detection coil assembly is fixed in the sensor housing.

Since the detection coil assembly is fixed in the sensor housing through the structural modification of the sensor housing and detection coil assembly, without using a separate fixing member, it is possible to effectively achieve the fixing of the detection coil assembly, and thus, to reduce the number of elements in the torque sensor.

Although a few embodiments of the present general inventive concept have been shown and described, it will be appreciated by those skilled in the art that changes may be made in these embodiments without departing from the principles and spirit of the invention, the scope of which is defined in the appended claims and their equivalents.

What is claimed is:

1. A torque sensor comprising a torsion bar to coaxially connect an input shaft coupled with a steering wheel and an output shaft coupled with a steering mechanism, at least two detection rings fixedly fitted around the input and output shafts, at least one detection coil assembly having an annular structure to enclose adjacent portions of the detection rings, and a sensor housing to receive the detection coil assembly, further comprising:

a first step formed on an inner peripheral surface of the sensor housing;

a second step formed on an outer peripheral surface of the detection coil assembly, the first and second steps axially supporting each other; and a groove penetrating the outer peripheral surface of the detection coil assembly at a position adjacent to the second step such that the groove faces an inner surface portion of the first step, so that the first step penetrates the groove while being plastically deformed when the detection coil assembly is pressed toward the first step.

2. The torque sensor according to claim 1, wherein the detection coil assembly is made of a material having a hardness larger than the sensor housing.

3. The torque sensor according to claim 2, wherein the detection coil assembly is made of a steel material, and the sensor housing is made of an aluminum material.

4. The torque sensor according to claim 1, wherein the first step is circumferentially formed on the sensor housing, and the second step and groove are circumferentially formed on the detection coil assembly.

5. The torque sensor according to claim 1, wherein: the at least one detection coil assembly comprises a plurality of detection coil assemblies; and the first step is formed on the inner peripheral surface of the sensor housing at the side of a lowermost one of the detection coil assemblies, and the second step and groove are formed at the outer peripheral surface of the lowermost detection coil assembly so that, the remaining detection coil assemblies disposed over the lowermost detection coil assembly are fixed by the lowermost detection coil assembly.

6. The torque sensor according to claim 5, wherein: each of the detection coil assemblies is assembled in the sensor housing through a lower end of the sensor housing; and each of the remaining detection coil assemblies disposed over the lowermost detection coil assembly has an outer diameter smaller than an inner diameter of the sensor housing at the first step.

7. The torque sensor according to claim 1, wherein: the at least one detection coil assembly comprises a plurality of detection coil assemblies; and the first step is formed on the inner peripheral surface of the sensor housing at the side of each detection coil assembly, and the second step and groove are formed at the outer peripheral surface of each detection coil assembly so that the detection coil assemblies are fixed in an independent manner, respectively.

8. The torque sensor according to claim 7, wherein: each of the detection coil assemblies is assembled in the sensor housing through a lower end of the sensor housing; and the first step corresponding to an upper one of the detection coil assemblies, which are vertically adjacent to each other, has an inner diameter smaller than an inner diameter of the first step corresponding to a lower one of the vertically-adjacent detection coil assemblies, and the upper and lower detection coil assemblies have outer diameters respectively corresponding to the inner diameters of the first steps so that the upper detection coil assembly does not interfere with the first step corresponding to the lower detection coil assembly during a process of assembling the detection coil assemblies.

* * * * *